(12) United States Patent
Dubois et al.

(10) Patent No.: US 11,714,620 B1
(45) Date of Patent: Aug. 1, 2023

(54) DECOUPLING LOOP DEPENDENCIES USING BUFFERS TO ENABLE PIPELINING OF LOOPS

(71) Applicant: Triad National Security, LLC, Los Alamos, NM (US)

(72) Inventors: Andrew John Dubois, Los Alamos, NM (US); Stephen Wayne Poole, Los Alamos, NM (US); Laura Marie Morton Monroe, Los Alamos, NM (US); Robert W. Robey, Los Alamos, NM (US); Brett R. Neuman, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 6 days.

(21) Appl. No.: 17/576,407

(22) Filed: Jan. 14, 2022

(51) Int. Cl.
 *G06F 8/41* (2018.01)
 *G06F 15/80* (2006.01)

(52) U.S. Cl.
 CPC ........ *G06F 8/4452* (2013.01); *G06F 15/8053* (2013.01)

(58) Field of Classification Search
 None
 See application file for complete search history.

(56) References Cited

U.S. PATENT DOCUMENTS

| | | |
|---|---|---|
| 5,233,545 A | 8/1993 | Ho et al. |
| 5,386,562 A | 1/1995 | Jain et al. |
| 5,655,096 A | 8/1997 | Branigin |
| 5,901,318 A | 5/1999 | Hsu |
| 5,920,724 A | 7/1999 | Chang |
| 5,950,007 A | 9/1999 | Nishiyama et al. |
| 6,016,399 A | 1/2000 | Chang |
| 6,192,072 B1 | 2/2001 | Azadet et al. |
| 6,192,515 B1 | 2/2001 | Doshi et al. |
| 6,418,489 B1 | 7/2002 | Mason et al. |
| 6,446,190 B1 | 9/2002 | Barry et al. |
| 6,571,385 B1 | 5/2003 | Muthukumar et al. |
| 6,594,814 B1 | 7/2003 | Jou et al. |
| 6,817,007 B2 | 11/2004 | Burnette et al. |
| 6,892,380 B2 | 5/2005 | Granston et al. |
| 7,171,541 B1 | 1/2007 | Seki |
| 7,177,421 B2 | 2/2007 | Buer et al. |
| 7,316,012 B2 | 1/2008 | Muthukumar |
| 7,331,045 B2 | 2/2008 | Martin et al. |
| 7,463,681 B2 | 12/2008 | Garg et al. |
| 7,493,611 B2 | 2/2009 | Martin |

(Continued)

OTHER PUBLICATIONS

Intel High Level Syntheses Compiler Pro Edition: Best Practices Guide available at https://www.intel.com/content/www/us/en/programmable/documentation/nml1505158467345.html#cup1508901513548 (Mar. 29, 2021).

(Continued)

*Primary Examiner* — Marina Lee
(74) *Attorney, Agent, or Firm* — LeonardPatel PC; Michael A. Leonard, II; Sheetal S. Patel (57) ABSTRACT

Decoupling loop dependencies using first in, first out (FIFO) buffers or other types of buffers to enable pipelining of loops is disclosed. By using buffers along with tailored ordering of their writes and reads, loop dependencies can be decoupled. This allows the loop to be pipelined and can lead to improved performance.

20 Claims, 7 Drawing Sheets

(56) References Cited

U.S. PATENT DOCUMENTS

| | | |
|---|---|---|
| 7,496,864 B2 | 2/2009 | Burnette et al. |
| RE41,012 E | 11/2009 | Barry et al. |
| 7,698,696 B2 | 4/2010 | Ogawa et al. |
| 7,853,637 B2 | 12/2010 | Papadantonakis et al. |
| 7,856,629 B2 | 12/2010 | Michimoto et al. |
| 7,930,688 B2 | 4/2011 | Martin et al. |
| 7,962,907 B2 | 6/2011 | Martin et al. |
| 8,000,469 B2 | 8/2011 | Buer et al. |
| 8,146,030 B2 | 3/2012 | Burnette et al. |
| 8,200,944 B2 | 6/2012 | Lee et al. |
| 8,387,035 B2 | 2/2013 | Martin |
| 8,418,157 B2 | 4/2013 | Ogawa et al. |
| 8,576,924 B2 | 11/2013 | Kwan et al. |
| 8,589,666 B2 | 11/2013 | Hammes |
| 8,699,558 B1 | 4/2014 | Wang |
| 8,752,036 B2 | 6/2014 | Kalogeropulos et al. |
| 8,843,675 B2 | 9/2014 | Krig |
| RE45,199 E | 10/2014 | Michimoto et al. |
| 8,964,925 B1 | 2/2015 | Saed |
| 9,229,791 B1 | 1/2016 | Thekkeettil |
| 9,513,922 B2 | 12/2016 | Palalau |
| 9,660,624 B1 | 5/2017 | Safari et al. |
| 9,733,945 B2 | 8/2017 | Barowski et al. |
| 10,025,566 B1 | 7/2018 | Ahmed et al. |
| 10,068,306 B2 | 9/2018 | Rao et al. |
| 10,241,959 B1 | 3/2019 | Tianxiang |
| 10,552,349 B1 | 2/2020 | Shavit et al. |
| 10,628,142 B2 | 4/2020 | Villarreal, Jr. |
| 2003/0237080 A1* | 12/2003 | Thompson ............... G06F 8/441 712/241 |
| 2006/0004996 A1* | 1/2006 | Gonion ................... G06F 8/443 712/241 |
| 2019/0196964 A1 | 6/2019 | Byun |
| 2019/0332429 A1* | 10/2019 | Koneru ..................... G06F 8/44 |
| 2019/0335189 A1 | 10/2019 | Abdelkhalek et al. |
| 2020/0042697 A1* | 2/2020 | Gauthier ............. G06F 11/3636 |
| 2020/0257510 A1* | 8/2020 | Deodhar ............... G06F 8/4452 |

OTHER PUBLICATIONS

Wikipedia Kahan Summation Algorithm Article available at https://en.wikipedia.org/wiki/Kahan_summation_algorithm (last accessed May 20, 2021).

William Kahan, "Further remarks on reducing truncation errors", Communications of the ACM, 8 (1): 40 (Jan. 1965).

Xilinx SDSoC Profiling and Optimization Guide available at https://www.xilinx.com/support/documentation/sw_manuals/xilinx2019_1/ug1235-sdsoc-optimization-guide.pdf (May 22, 2019).

* cited by examiner

RELATED ART

DECOUPLING LOOP DEPENDENCIES USING BUFFERS TO ENABLE PIPELINING OF LOOPS

FIELD

The present invention generally relates to pipelining, and more particularly, to decoupling loop dependencies using buffers to enable pipelining of loops.

BACKGROUND

Moore's Law has been the main driver for the computing and semiconductor industries for roughly the last 50 years. However, due to device physics issues and ballooning costs, performance improvements have slowed and no longer follow Moore's Law. Thus, there is significant need and demand in these industries to find ways of improving performance and reducing energy for all types of computing systems and semiconductors.

One critical way to improve performance and energy efficiency is by porting software to custom hardware. Using custom hardware allows for optimization of the configuration and amount of transistors used for a particular software function, which can lead to better performance and improved energy efficiency compared to the original software solution. In particular, vectorizing hardware has shown great efficiency in executing software code that does not have certain dependencies.

A loop may be defined as a programming structure that repeats a sequence of instructions until a specific condition is met. Unfortunately, loop dependencies have traditionally prevented efficient porting of software loops to vectorizing hardware. Loop dependencies, where calculations in one iteration depend on calculations in another loop iteration, occur regularly in software, including scientific software.

There are two main types of loop dependencies—loop-carried dependencies and loop-independent dependencies. Loop-carried dependencies occur across iterations of a loop where, for example, the current iteration of a loop depends on results from a prior iteration. Loop-independent dependencies occur within statements of a loop where later statements depend on earlier statements to complete and generate their results.

Loop dependencies cause inefficiencies in both software and hardware. In software, loop dependencies can reduce or prevent the amount of parallelism that can potentially be applied via instruction-level parallelism (e.g., using multiple single instruction, multiple data (SIMD) units) and thread/core parallelism. Dependencies can also prevent compilers from automatically vectorizing loops, which requires programmers to be aware of this issue and to manually vectorize loops. Currently, when there is a dependency in the loop, the compiler refuses to vectorize. During execution, when the dependency is carried forward to next iteration in the computational process by a vectorizing processor, there is a time delay where the process has to wait for the previous iteration to complete for that value to be updated.

In hardware, loop dependencies reduce or prevent the pipelining that can be applied. Pipelining is a critical technique used to increase the performance of a hardware implementation of a software loop. With hardware pipelining, the hardware logic is split into smaller pieces, somewhat analogous to an automobile assembly line, where ideally, each piece has equal latency. Additionally, registers are added to the outputs of each piece. By splitting the logic into smaller pieces, the frequency of operation of the whole pipeline can be increased, and the rate at which new data can be introduced into the pipeline is also increased compared to the non-pipelined version of the hardware.

Loop dependencies are problematic when porting software to hardware because they make it difficult to optimize the loops via pipelining, or even prevent this optimization. This causes the loop latency to be exposed, which can take multiple clock cycles. This also leads to poor performance and can greatly reduce the use of hardware to help improve performance and energy efficiency. Accordingly, an improved approach may be beneficial.

SUMMARY

Certain embodiments of the present invention may provide solutions to the problems and needs in the art that have not yet been fully identified, appreciated, or solved by current technologies that attempt to address loop dependencies. For example, some embodiments of the present invention pertain to decoupling loop dependencies using buffers to enable pipelining of loops. It should be noted, however, that while first-in, first-out (FIFO) buffers are used in the examples herein, other buffer structures, such as a last-in-first-out (LIFO) buffer, may be used to provide solutions to the motivating problem identified in this document without deviating from the scope of the invention.

In an embodiment, a computing system includes a plurality of dedicated hardware buffers reserved for decoupling loop dependencies. The computing system also includes memory storing computer program instructions. The computer program instructions include code to be compiled and a compiler configured to compile the code and pipeline loop dependencies in the code during the compiling. The computing system further includes at least one vectorizing processor configured to execute the computer program instructions. The at least one vectorizing processor is communicably coupled to the plurality of dedicated hardware buffers and the memory. The computer program instructions are configured to cause the at least one vectorizing processor to assign variables with loop dependencies in the code being compiled by the compiler to respective dedicated hardware buffers of the plurality of dedicated hardware buffers. The computer program instructions are also configured to cause the at least one vectorizing processor to assign values for the respective variables in the code to the respective dedicated hardware buffers and order writes to and reads from the respective dedicated hardware buffers for the respective variables.

In another embodiment, a non-transitory computer-readable medium stores a computer program. The computer program is configured to cause at least one vectorizing processor to compile code and pipeline loop dependencies in the code during the compiling. The computer program is also configured to cause the at least one vectorizing processor to assign variables with loop dependencies in the code being compiled to respective dedicated hardware buffers of a plurality of dedicated hardware buffers and assign values for the respective variables to the respective dedicated hardware buffers. The computer program is further configured to cause the at least one vectorizing processor to order writes to and reads from the respective dedicated hardware buffers for the respective variables.

In yet another embodiment, a computer-implemented method for decoupling loop dependencies includes assigning, by a computing system including at least one vectorizing processor, variables with loop dependencies in code being compiled to respective dedicated hardware buffers of a plurality of dedicated hardware buffers. The computer-implemented method also includes assigning values for the respective variables to the respective dedicated hardware buffers, by the computing system. The computer-implemented method further includes ordering writes to and reads from the respective dedicated hardware buffers for the respective variables, by the computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Some embodiments pertain to decoupling loop dependencies using FIFO buffers to enable pipelining of loops. By using FIFO buffers along with tailored ordering of their writes and reads, loop dependencies can be decoupled. This allows the loop to be pipelined and can lead to improved performance.

Such embodiments may be beneficial to many computing domains including, but not limited to, high performance computing (e.g., scientific computing, computing for the oil and gas industry, and computing for national security purposes), Internet hardware (e.g., cloud computing hardware, data centers, and Internet-of-Things (IoT) devices), mobile devices, artificial intelligence (AI)/machine learning (ML) applications, semiconductor design, finite element analysis, etc.

Embodiments may be implemented in a software compiler, in physical hardware (e.g., vectorizing processors such as a central processing unit (CPU), a graphical processing unit (GPU), a field programmable gate array (FPGA), etc.), or both. A hardware FIFO buffer is a type of memory where the ordering of the output data is fixed in a first-in, first-out manner, which is somewhat analogous to serving individuals on a first-come, first-served basis. Hardware FIFO buffers have a write and a read interface for inputting data to and outputting data from the buffer, respectively. The write interface may use a mechanism such as a full flag to prevent data from being written to a full buffer, which would cause the data to be dropped. The read interface may use a mechanism such as an empty flag to indicate when the buffer has data available to prevent the reading of an empty buffer. There is also control logic that maintains and updates the write and read pointers that are used to determine where to write the next input data to and where to read the next output data from the FIFO buffer.

In modern hardware, some vector units can perform up to eight operations at the same time, which can lead to up to an 8-fold speed improvement. More parallel operations may be possible, however, depending on the architecture of the vector units without deviating from the scope of the invention. Efficiency depends on how frequent a loop is. Generally speaking, if a loop-dependent variable value can be stored in register-like memory during iterations of the loop, the impact of the dependency can be reduced. Currently, CPUs may unroll loops such that multiple iterations of the loop can be performed, but the loop cannot be vectorized. On an FPGA, for example, loops are unrolled to create new circuits, but multiple circuits like this are not currently possible on an FPGA. Thus, conventional hardware cannot solve this problem. However, the technique of some embodiments sets aside reserved memory space specifically for this purpose.

Typically, when a processor hits a memory address it needs, the processor loads values from main memory into the cache line. Limited cache is available in a processor, and it takes longer to load values from main memory than to access them directly from the cache. When cache conflicts occur, the conflicting value is popped out of cache and then reloaded. However, some embodiments prevent items that are pushed onto the stack from being replaced. As many values can be pushed onto the stack as the size of the stack permits during a current loop iteration. These values can then be popped off of the stack in the next loop iteration. The operating system, other software, and the hardware are prevented from removing needed items from this specialized cache in some embodiments.

This differs from a standard processor that controls such operations for the user. This automated control is not always a good thing. For example, if a subroutine is called that has four arguments, these values are typically pushed on a stack emulated in software rather than in hardware. A jump address is then pushed, the processor goes into the subroutine, the four arguments are popped out, the subroutine code is run, and then the processor jumps back.

Some embodiments are implemented in software via a compiler. For instance, an ARM processor could provide additional hidden registers that can be used by a compiler, such as LLVM. These registers are labeled as "hidden" since they are not visible to the normal software process. These hidden registers are set aside solely for internal use in some embodiments. For example, the hidden registers may be used by compilers or other processes that need temporary space to hold intermediate results. Such software can do anything permitted by the constraints that the hardware offers in some embodiments. Memory in the processor can be used as temporary register space for the FIFO buffer and controlled such that values in the cache are not replaced unless desired.

Per the above, a loop-carried dependency may be added where the second iteration of a loop is dependent on the first iteration. This may occur, for example, in the case of a floating-point summation when the next term is added to the previous residual term containing the correction from the rounding error from the previous step. On a conventional FPGA, 8-10 cycles may be required before the next value of the summation could be added. However, in some embodiments, the value to be added may be pushed out of the loop to be added in later, without needing 8-10 copies of the loop and consuming additional resources. Another example of a loop is the loop-independent calculation z=x+y, where the value of z is dependent on each of the added values. Yet another example is a reduction. However, these nonlimiting examples of loop dependencies of various types appear in many algorithms. All of this depends on commutativity and associativity of summation.

The FIFO buffer is treated like a circular queue in some embodiments, where the write and read pointers wrap around to the beginning of the buffer after reaching the end of the buffer. The read pointer is always at the earliest addition for FIFO. This is contrasted with LIFO, where the read pointer is at the latest addition.

The Kahan summation algorithm was used to demonstrate how the FIFO buffer of some embodiments works and the performance improvements that can be realized. See William Kahan, "Further remarks on reducing truncation errors," Communications of the ACM, 8 (1): 40 (January 1965). The Kahan summation algorithm, also known as compensated summation, is used to generate a more accurate result on floating-point summations at a given precision having terms that include both very large and very small values.

For this particular example, the High-Level Synthesis (HLS) tool by Intel® was used to compile C code for the FPGA. While this tool may be used to develop some embodiments, any suitable tool may be used without deviating from the scope of the invention.

The main loop contains both loop-carried and loop-independent dependencies, which allows demonstration of how the algorithm of some embodiments works in both cases. The main loop of the Kahan summation is shown below.

```
for (long i=0; i<ncells; i++) {
    double increment=list[i]+compensation;
    double compensated_sum=sum+increment;
    compensation=increment-(compensated_sum—sum);
    sum=compensated_sum;
}
```

Figure 1A:
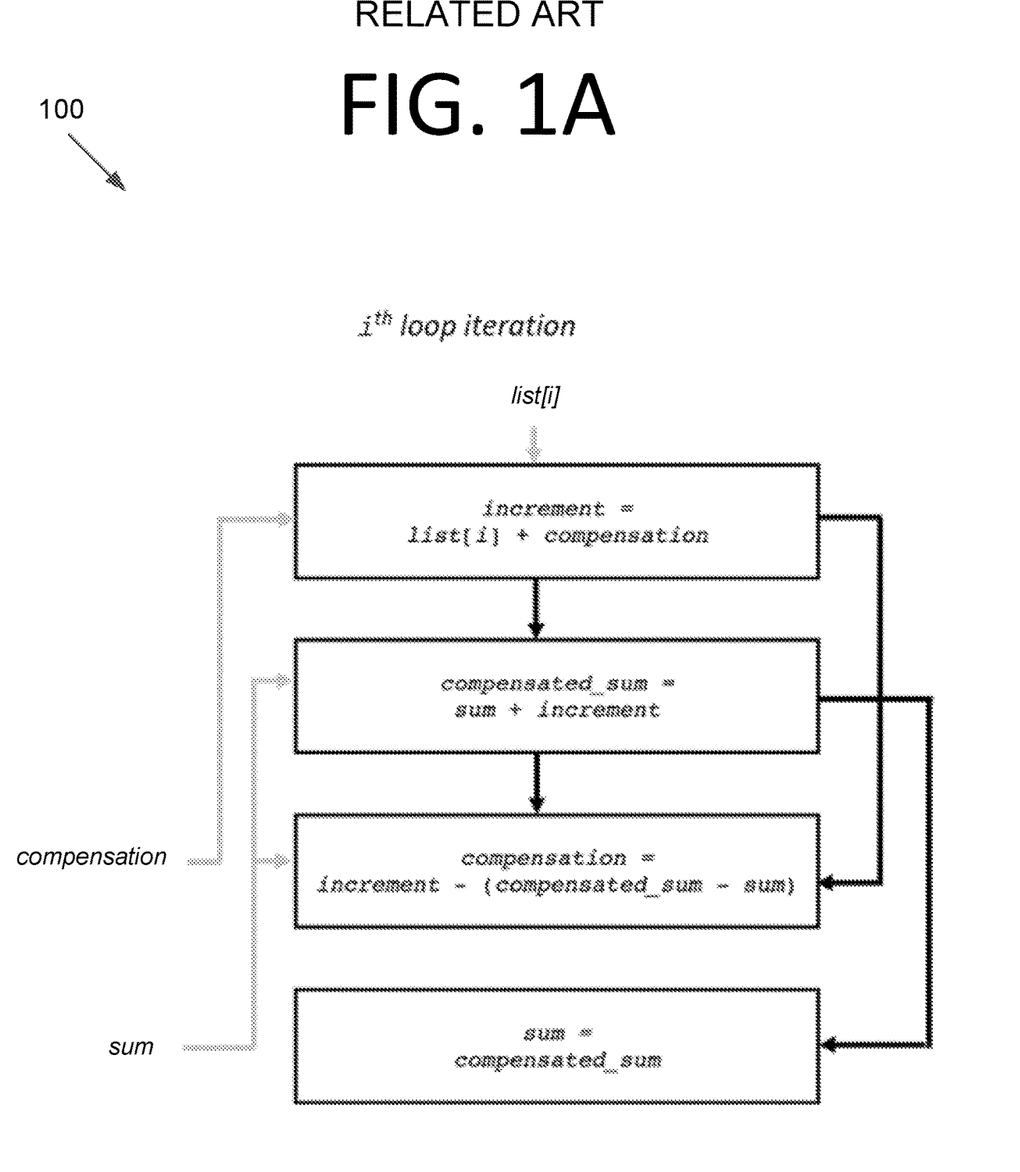
FIG. 1A illustrates an example of loop-independent dependencies.
Figure 1B:
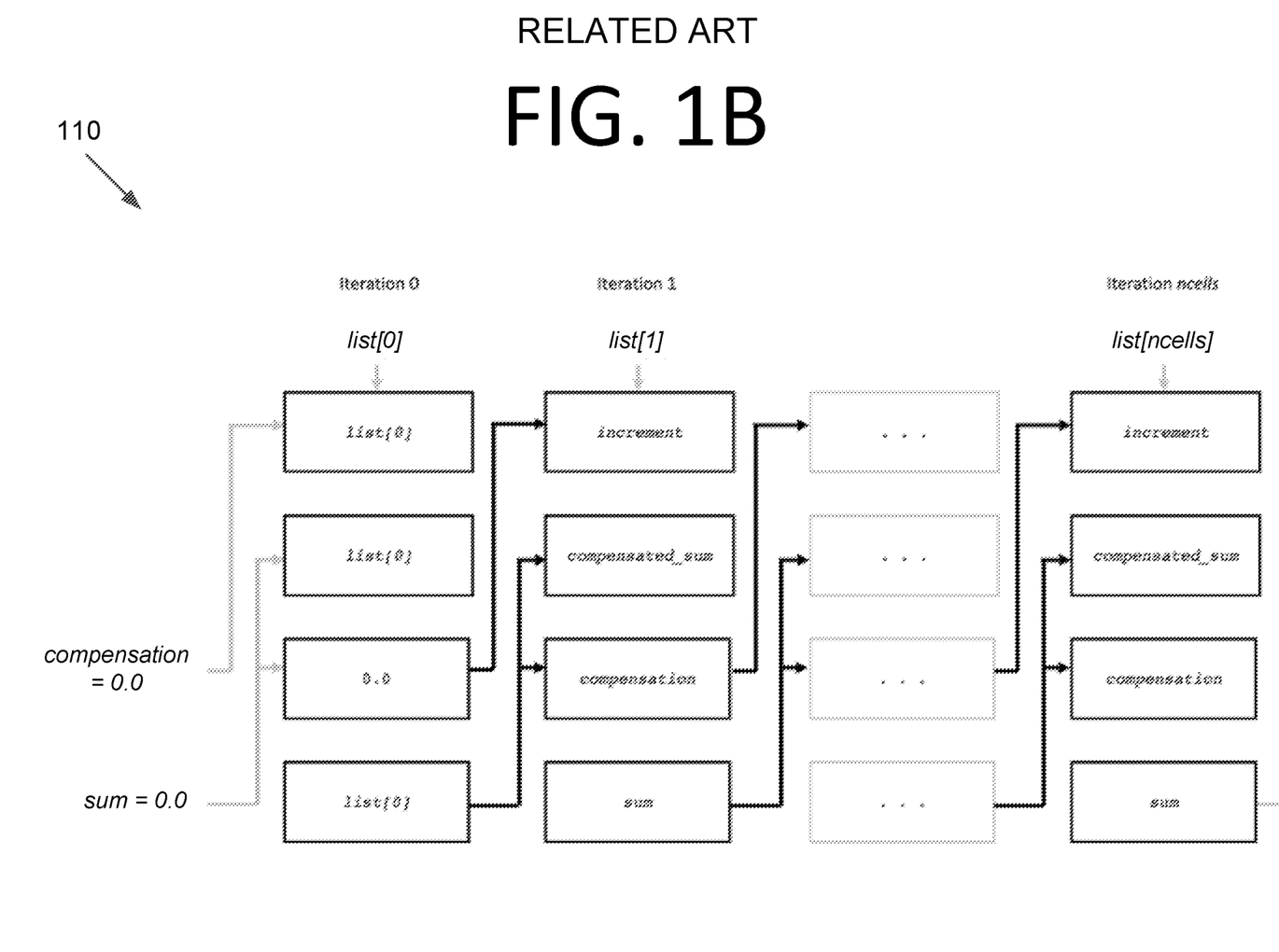
FIG. 1B illustrates an example of loop-carried dependencies.

The increment and compensated_sum variables are loop dependencies since they are required by the last two statements in the loop. The compensation and sum variables are loop-carried dependencies since they hold the corrections to the floating-point truncations applied by the Kahan algorithm and carry them over to subsequent iterations of the loop. Examples of loop-independent dependencies 100 and loop-carried dependencies 110 are shown in FIGS. 1A and 1B, respectively.

Shown below is the main loop using the FIFO approach of some embodiments and using the HLS FIFO syntax. The only changes that are required in some embodiments are the FIFO write commands (in bold) and the FIFO read commands (in italics).

The FIFO write commands are done in a nonblocking fashion in some embodiments, which means that the hardware does not need to wait for the commands to complete before continuing execution. The FIFO read commands should be performed in a blocking fashion, meaning that the hardware must wait for the reads to complete before continuing execution. This is shown below. Note that vector_ncells=ncells/vector_size.

```
for (int i=0; i<vector_ncells; i++) {
    increment.data[j]=var_in[i*4+j]+compensation.data[j];
    compensated_sum.data[j]=sum.data[j]+increment.data[j];
    increment_fifo.tryWrite(increment);
    compensated_sum_fifo.tryWrite(compensated_sum);
    increment=increment_fifo.read( );
    compensated_sum=compensated_sum_fifo.read( )
    compensation.data[j]=increment.data[j]-(compensated_sum.data[j]-sum.data[j]);
    sum.data[j]=compensated_sum.data[j];
    compensation_fifo.tryWrite(compensation);
    sum_fifo.tryWrite(sum);
    compensation=compensation_fifo.read( );
    sum=sum_fifo.read( )
}
```

Figure 2:
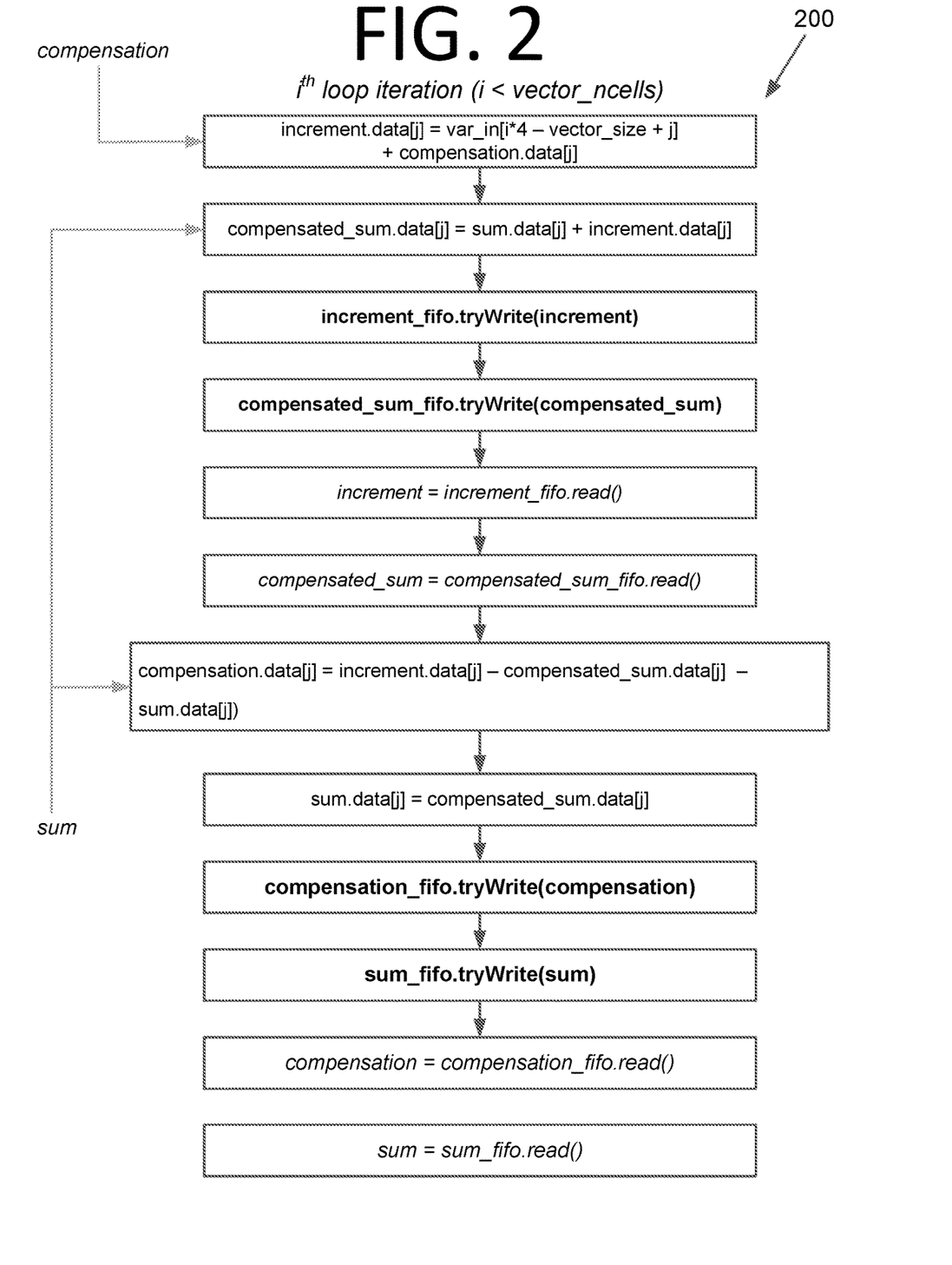
FIG. 2 illustrates a FIFO approach to a Kahan summation, according to an embodiment of the present invention.

This approach is also illustrated graphically for a given iteration in flowchart 200 of FIG. 2. In this example, vector_size is the size of the one-dimensional array of data that the vectorizing processor is designed to operate on. Also, FIFO queues increment_fifo, compensated_sum_fifo, compensation_fifo, and sum_fifo are used for increment, compensated_sum, compensation, and sum, respectively. var_in is the vectorized list being summed and j is the element in the vector. In other words, j<vector_size data[j] is the $j^{th}$ element in the data member of the structure so data may hold what has been added or the compensation. The FIFO write commands should be done before the FIFO reads, and the FIFO writes and reads for a given dependent variable should be done after the dependent variable has been updated and before the dependent variable is used by a subsequent statement or iteration of the loop.

An important metric of performance of a hardware loop is called the "initiation interval (II)." This metric describes how frequently each iteration of a loop can be executed in terms of clock cycles. For the Kahan summation loop, the II before using FIFO buffers was approximately 120 clock cycles, which meant that a new iteration of the loop could not start until the current iteration completed roughly 120 clocks later. Using the FIFO buffer technique of some embodiments, the II for the loop was reduced to a single clock cycle, which is roughly a 120-fold improvement in performance. The FIFO buffer technique of some embodiments has been tested on other loops, including a naïve summation loop where the II was reduced from approximately 38 clock cycles to a single clock cycle for a roughly 38-fold improvement. The FIFO buffer technique of some embodiments was also tested on a "while" loop that performed integer operations, yielding an 11-fold improvement. The latency of a loop is dependent on what type of operations and how many operations are performed in the loop, along with any parallelism that can be applied to the operations.

It should be noted that a loop will not vectorize if there are loop-carried dependencies, and the loop also often will not vectorize if there are loop-independent dependencies. Reading a variable in from the FIFO buffer makes it appear as though there was no dependency at all having to do with that variable since the variable seems to come from FIFO buffer memory space outside of the loop. This is true even though what was read into the FIFO buffer is either a loop-carried dependency or a loop-independent dependency. Thus, the compiler is "tricked" with the use of the FIFO buffer.

While the Kahan summation example above is one implementation where hardware FIFO queues can be used to vectorize loops, many other implementations of buffers for other algorithms/purposes can be implemented without deviating from the scope of the invention. Generally speaking, a buffer can be allocated for each variable to be vectorized from among a pool of physical buffers dedicated for loop vectorization. Processors 300, 400, 510 of FIGS. 3-5, respectively, show examples of processors that provide such loop decoupling functionality via dedicated buffers.

Figure 3:
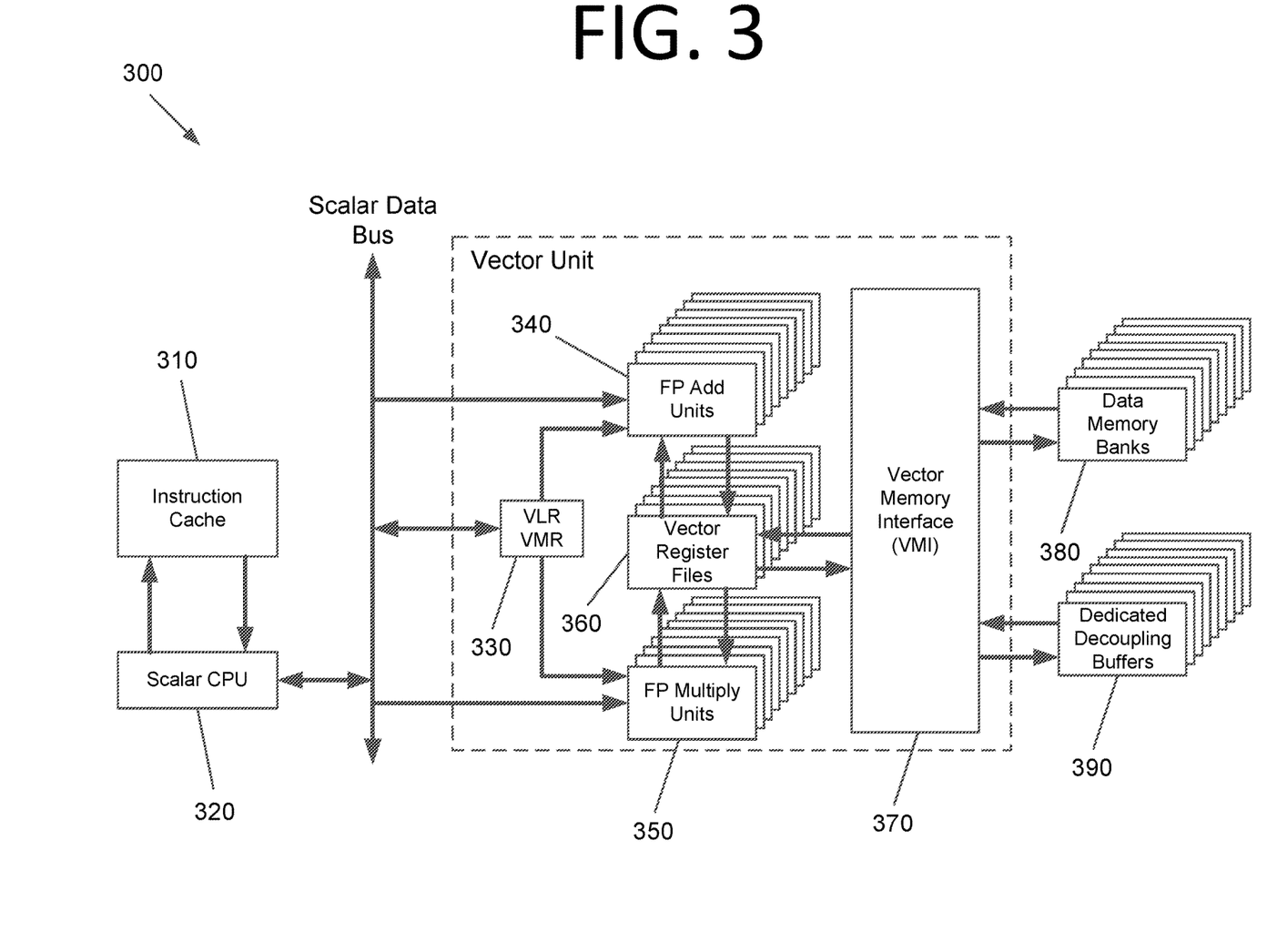
FIG. 3 is an architectural diagram illustrating a vectorizing processor configured to decouple loop dependencies in a compiler using buffers to enable pipelining of loops, according to an embodiment of the present invention.

FIG. 3 is an architectural diagram illustrating a vectorizing processor 300 configured to decouple loop dependencies in a compiler using buffers to enable pipelining of loops, according to an embodiment of the present invention. In some embodiments, vectorizing processor 300 is one of processor(s) 510 of FIG. 5. Vectorizing processor 300 includes an instruction cache 310 and a scalar CPU 320 communicably connected to instruction cache 310. Scalar CPU 320 also communicates with components of a vector unit via a scalar data bus.

The vector unit includes a vector length register (VLR)/vector mask register (VMR) 330, floating point (FP) add units 340, FP multiply units 350, vector register files 360, and a vector memory interface (VMI) 370. VMI provides access to data memory banks 380 and dedicated decoupling buffers 390 that are used by processor 300 to store values for variables with loop dependencies. The loop dependencies are essentially hidden from the perspective of a compiler.

Figure 4:
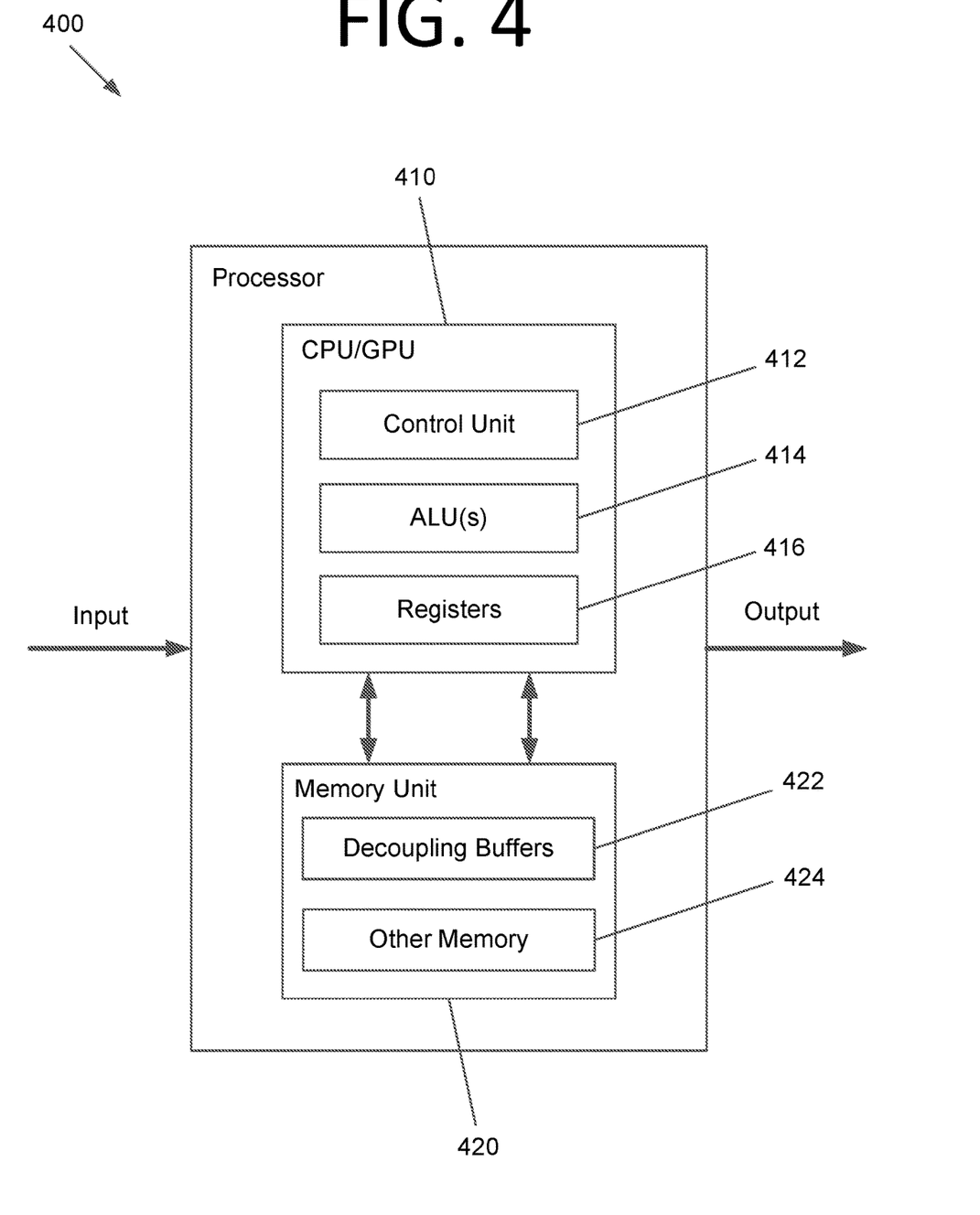
FIG. 4 is an architectural diagram illustrating a processor configured to decouple loop dependencies in a compiler using buffers to enable pipelining of loops, according to an embodiment of the present invention.

FIG. 4 is an architectural diagram illustrating a processor 400 configured to decouple loop dependencies in a compiler using buffers to enable pipelining of loops, according to an embodiment of the present invention. In some embodiments, processor 400 is one of processor(s) 510 of FIG. 5. Processor 400 includes a CPU/GPU 410 (e.g., processor 400 implements CPU or GPU functionality) and a memory unit 420. CPU/GPU 410 includes a control unit 412, ALU(s) 414, and registers 416. Memory unit 420 includes dedicated decoupling buffers 422 and other memory 424 for all other processor storage needs. Dedicated decoupling buffers 422 provide storage for values of variables for decoupling loop dependencies when processor 400 is compiling.

Figure 5:
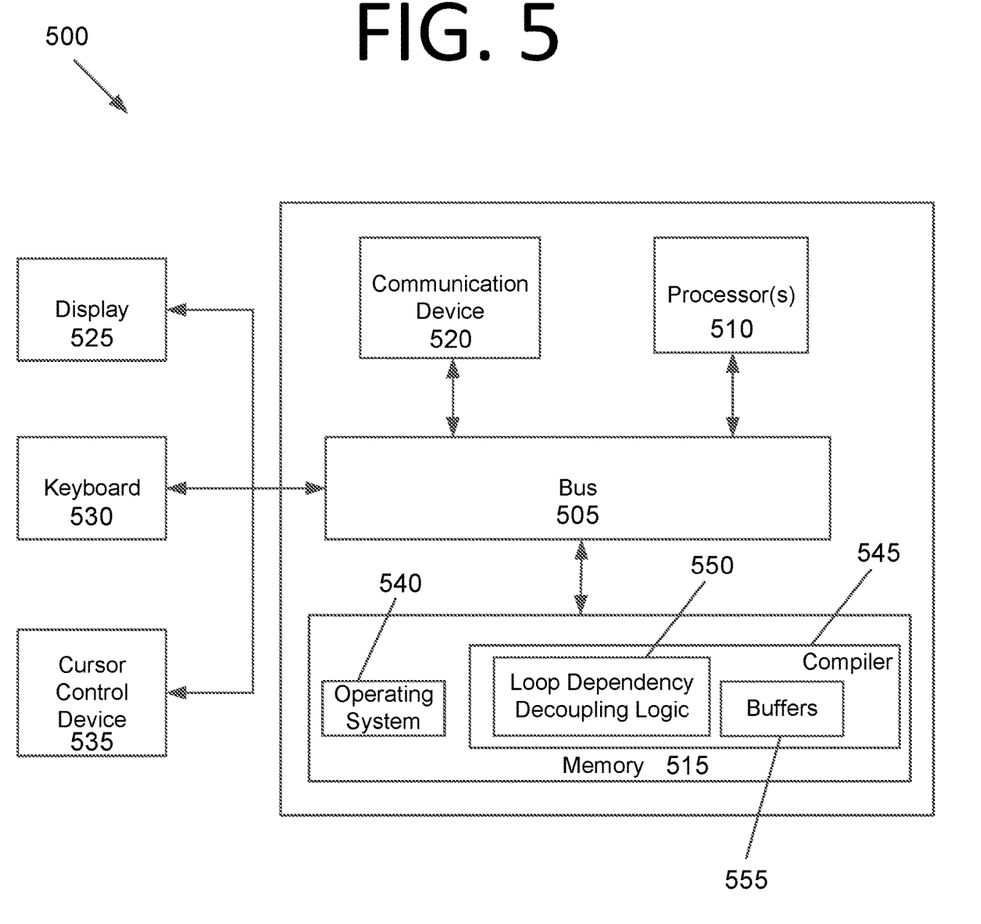
FIG. 5 is an architectural diagram illustrating a computing system configured to decouple loop dependencies in a compiler using buffers to enable pipelining of loops, according to an embodiment of the present invention.

FIG. 5 is an architectural diagram illustrating a computing system 500 configured to decouple loop dependencies in a compiler 545 using buffers 555 to enable pipelining of loops, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a compiler 545, which includes loop dependency decoupling logic 550 that is configured to perform all or part of the processes described herein or derivatives thereof and dedicated buffers 555 for decoupling the loop dependencies in accordance with loop dependency decoupling logic 550.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
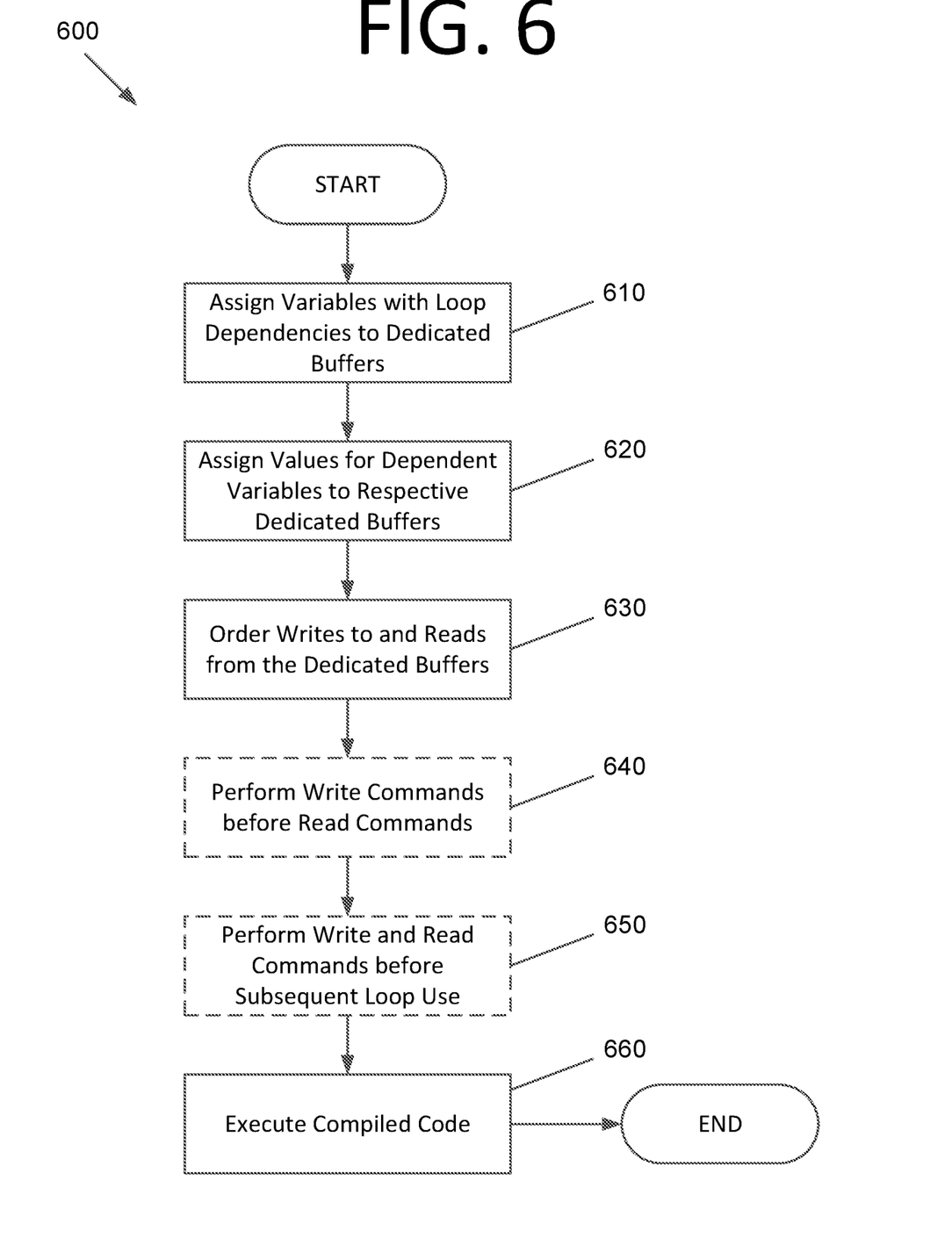
FIG. 6 is a flowchart illustrating a process for decoupling loop dependencies via a compiler using vectorizing hardware, according to an embodiment of the present invention.

FIG. 6 is a flowchart illustrating a process 600 for decoupling loop dependencies via a compiler using vectorizing hardware, according to an embodiment of the present invention. The process begins with assigning variables in a loop of the code being compiled by the compiler to respective dedicated hardware buffers of the plurality of dedicated hardware buffers at 610. Values for the respective variables with dependencies are assigned to the respective dedicated hardware buffers at 620. For instance, the values may be variable values during different loop iterations. Writes to and reads from the respective dedicated hardware buffers for the respective variables are ordered at 630.

When the dependency is a loop-carried dependency, the write commands for the dedicated hardware buffers are performed before the read commands for the dedicated hardware buffers at 640. Also, the write commands and read commands for the dependent variables are performed after the loop-dependent variables have been updated and before the loop-dependent variables are used by a subsequent statement or iteration of the loop at 650. After the code is compiled by the compiler, the compiled code is executed at 660. During execution, the ordered writes to and reads from the respective dedicated hardware buffers are performed for the respective variables.

In some embodiments, the plurality of dedicated hardware buffers include a FIFO buffer, a LIFO buffer, or both. In certain embodiments, the dedicated hardware buffers are configured to prevent values that are pushed onto the dedicated hardware buffers from being replaced during a current iteration of a loop, although this may be enforced by the compiler in some embodiments. In some embodiments, the dedicated hardware buffers are configured to permit the values pushed onto the dedicated hardware buffers to be popped off of the dedicated hardware buffers during the next iteration of the loop.

In some embodiments, an operating system, other hardware, and other software of a computing system executing the compiler are prevented from removing values stored in the dedicated hardware buffers. In certain embodiments, write commands for the dedicated hardware buffers are performed in a nonblocking fashion where a vectorizing processor does not wait for the write command to complete before continuing execution. Read commands for the dedicated hardware buffers, on the other hand, are performed in a blocking fashion where the vectorizing processor waits for the read command to complete before continuing execution. In some embodiments, when the dependency is a loop-carried dependency, reading a variable from the plurality of dedicated hardware buffers appears to the compiler as though no loop-carried dependency exists since the variable appears to come from buffer memory space outside of the loop, despite the variable having the loop-carried dependency.

The process steps performed in FIG. 6 may be performed by a computer program, encoding instructions for the processor(s) to perform at least part of the process(es) described in FIG. 6, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 300, 400, 510 of FIGS. 3, 4, and 5, respectively) to implement all or part of the process steps described in FIG. 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computing system, comprising:
a plurality of dedicated hardware buffers reserved for decoupling dependencies;
memory storing computer program instructions comprising code to be compiled and a compiler configured to compile the code and pipeline loop dependencies in the code during the compiling; and
at least one vectorizing processor configured to execute the computer program instructions, the at least one vectorizing processor communicably coupled to the plurality of dedicated hardware buffers and the memory, wherein the computer program instructions are configured to cause the at least one vectorizing processor to:
assign variables with loop dependencies in the code being compiled by the compiler to respective dedicated hardware buffers of the plurality of dedicated hardware buffers;
assign values for the respective variables to the respective dedicated hardware buffers; and
order writes to and reads from the respective dedicated hardware buffers for the respective variables.

2. The computing system of claim 1, wherein the plurality of dedicated hardware buffers comprise a first-in, first-out (FIFO) buffer, a last-in, first out (LIFO) buffer, or both.

3. The computing system of claim 1, wherein after compiling the code by executing the compiler, the computer program instructions are further configured to cause the at least one vectorizing processor to:
execute the compiled code, the execution of the compiled code comprising performing the ordered writes to and reads from the respective dedicated hardware buffers for the respective variables.

4. The computing system of claim 1, wherein the plurality of dedicated hardware buffers or the compiler are configured to prevent values that are pushed onto the plurality of dedicated hardware buffers from being replaced during a current iteration of a loop.

5. The computing system of claim 4, wherein the plurality of dedicated hardware buffers are configured to permit the values pushed onto the plurality of dedicated hardware buffers to be popped off of the plurality of dedicated hardware buffers during a next iteration of the loop.

6. The computing system of claim 1, wherein an operating system, other hardware, and other software of the computing system are prevented from removing values stored in the plurality of dedicated hardware buffers by the at least one vectorizing processor.

7. The computing system of claim 1, wherein the computer program instructions are configured to cause the at least one vectorizing processor to:
perform write commands for the plurality of dedicated hardware buffers in a nonblocking fashion where the at least one vectorizing processor does not wait for the write command to complete before continuing execution; and
perform read commands for the plurality of dedicated hardware buffers in a blocking fashion where the at least one vectorizing processor waits for the read command to complete before continuing execution.

8. The computing system of claim 1, wherein when the dependency is a loop-carried dependency, the computer program instructions are configured to cause the at least one processor to:
  perform the write commands for the plurality of dedicated hardware buffers before the read commands for the plurality of dedicated hardware buffers; and
  perform the write commands and read commands for a given dependent variable after the dependent variable has been updated and before the dependent variable is used by a subsequent statement or iteration of the loop.

9. The computing system of claim 1, wherein when the dependency is a loop-carried dependency, the plurality of dedicated hardware buffers are configured such that reading a variable from the plurality of dedicated hardware buffers appears to the compiler as though no loop-carried dependency exists since the variable appears to come from buffer memory space outside of the loop, despite the variable having the loop-carried dependency.

10. A non-transitory computer-readable medium storing a computer program, wherein the computer program is configured to cause at least one vectorizing processor to:
  compile code and pipeline loop dependencies in the code during the compiling;
  assign variables with loop dependencies in the code being compiled to respective dedicated hardware buffers of a plurality of dedicated hardware buffers;
  assign values for the respective variables to the respective dedicated hardware buffers; and
  order writes to and reads from the respective dedicated hardware buffers for the respective variables.

11. The non-transitory computer-readable medium of claim 10, wherein after compiling the code, the computer program is further configured to cause the at least one vectorizing processor to:
  execute the compiled code, wherein
  the execution of the compiled code comprises performing the ordered writes to and reads from the respective dedicated hardware buffers for the respective variables.

12. The non-transitory computer-readable medium of claim 10, wherein the computer program is further configured to cause the at least one vectorizing processor to:
  prevent values that are pushed onto the plurality of dedicated hardware buffers from being replaced during a current iteration of a loop.

13. The non-transitory computer-readable medium of claim 12, wherein the plurality of dedicated hardware buffers are configured to permit the values pushed onto the plurality of dedicated hardware buffers to be popped off of the plurality of dedicated hardware buffers during a next iteration of the loop.

14. The non-transitory computer-readable medium of claim 10, wherein the computer program is configured to cause the at least one vectorizing processor to:
  perform write commands for the plurality of dedicated hardware buffers in a nonblocking fashion where the at least one vectorizing processor does not wait for the write command to complete before continuing execution; and
  perform read commands for the plurality of dedicated hardware buffers in a blocking fashion where the at least one vectorizing processor waits for the read command to complete before continuing execution.

15. The non-transitory computer-readable medium of claim 10, wherein when the dependency is a loop-carried dependency, the computer program is configured to cause the at least one processor to:
  perform the write commands for the plurality of dedicated hardware buffers before the read commands for the plurality of dedicated hardware buffers; and
  perform the write commands and read commands for a given dependent variable after the dependent variable has been updated and before the dependent variable is used by a subsequent statement or iteration of the loop.

16. A computer-implemented method for decoupling loop dependencies, comprising:
  assigning, by a computing system comprising at least one vectorizing processor, variables with loop dependencies in code being compiled to respective dedicated hardware buffers of a plurality of dedicated hardware buffers;
  assigning values for the respective variables to the respective dedicated hardware buffers, by the computing system; and
  ordering writes to and reads from the respective dedicated hardware buffers for the respective variables, by the computing system.

17. The computer-implemented method of claim 16, further comprising:
  after compiling the code, executing the compiled code, by the computing system, wherein
  the execution of the compiled code comprises performing the ordered writes to and reads from the respective dedicated hardware buffers for the respective variables.

18. The computer-implemented method of claim 16, further comprising:
  performing, by the computing system, write commands for the plurality of dedicated hardware buffers in a nonblocking fashion, by the computing system, where the at least one vectorizing processor does not wait for the write command to complete before continuing execution; and
  performing, by the computing system, read commands for the plurality of dedicated hardware buffers in a blocking fashion where the at least one vectorizing processor waits for the read command to complete before continuing execution.

19. The computer-implemented method of claim 16, wherein when the dependency is a loop-carried dependency, the method further comprises:
  performing the write commands for the plurality of dedicated hardware buffers before the read commands for the plurality of dedicated hardware buffers, by the computing system; and
  performing the write commands and read commands for a given dependent variable after the dependent variable has been updated and before the dependent variable is used by a subsequent statement or iteration of the loop, by the computing system.

20. The computer-implemented method of claim 16, wherein when the dependency is a loop-carried dependency, the plurality of dedicated hardware buffers are configured such that reading a variable from the plurality of dedicated hardware buffers appears to the compiler as though no loop-carried dependency exists since the variable appears to come from buffer memory space outside of the loop, despite the variable having the loop-carried dependency.

* * * * *